June 14, 1932.  A. VAN VEEN  1,862,990
TRIMMING MACHINE
Filed June 22, 1928   3 Sheets-Sheet 1

Inventor
Anton Van Veen
By
His Attorney

June 14, 1932. A. VAN VEEN 1,862,990
TRIMMING MACHINE
Filed June 22, 1928 3 Sheets-Sheet 2

Inventor
Anton Van Veen
by F. Clay Lindsey
His Attorney

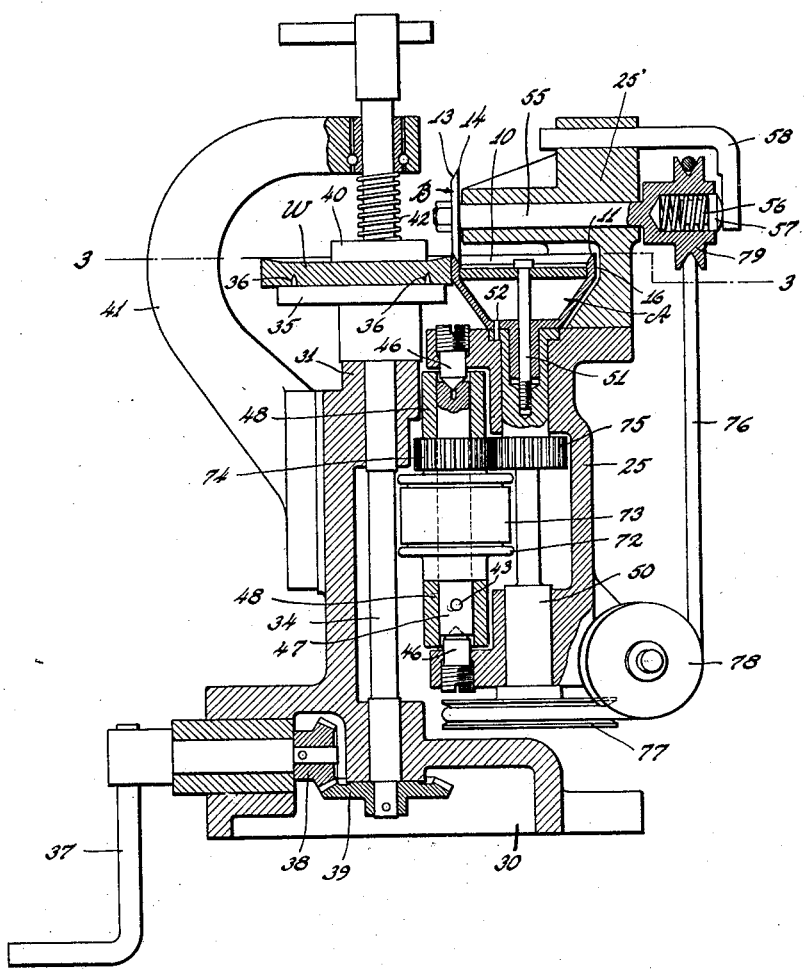

Patented June 14, 1932

1,862,990

UNITED STATES PATENT OFFICE

ANTON VAN VEEN, OF WEST HARTFORD, CONNECTICUT, ASSIGNOR, BY MESNE ASSIGNMENTS, TO PENROSE R. HOOPES, OF HARTFORD, CONNECTICUT

TRIMMING MACHINE

Application filed June 22, 1928. Serial No. 287,571.

This invention relates to trimming machines and, more particularly, to machines for trimming the overflow from molded rubber articles.

The aim of the invention is to provide an apparatus of this sort wherein the cutting instrumentality and the piece of work automatically assume and retain the proper relation to one another during the cutting operation. By the use of the present machine, the pieces of work may be expeditiously and accurately trimmed without the employment of hand labor for guiding or maintaining the work and cutter in the desired relation.

More specifically, the aim of the invention is to provide a trimming machine with a cutting instrumentality having a single cutting or shearing point, and relatively supporting the work and the cutting instrumentality in such manner that the cutting point, during the cutting operation, will automatically remain in the line of the edge of the work to be trimmed irrespective of the configuration of the work. As will be pointed out hereinafter more in detail, the cutting point of the cutter automatically remains constant at the point of tangency between the cutter and the work.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the present disclosure of the invention, which is by way of illustration only and is not to be taken as restrictive of my conception, the various features of novelty are incorporated in a machine for trimming the overflow from rubber heels and, while the invention is peculiarly adaptable for this use, I wish it clearly understood that the invention is also applicable for use in trimming various other objects.

In the accompanying drawings, wherein I have illustrated, for purposes of exemplification only, one of the many embodiments which the present invention may take:

Figure 1 is a diagrammatic view which illustrates the general principle of the present invention, the cutter being shown in full lines as having been initially brought into engagement with the edge of a piece of work which is in the form of a heel, and the cutter being shown by dotted lines in that position which it automatically assumes and in which position it is in proper cutting relation to the heel;

Fig. 5 is a vertical sectional view taken through the axis of the work and the axis of the cup of the cutter, the cutting mechanism being shown, so as to facilitate the illustration, somewhat out of its proper position.

Figure 1:
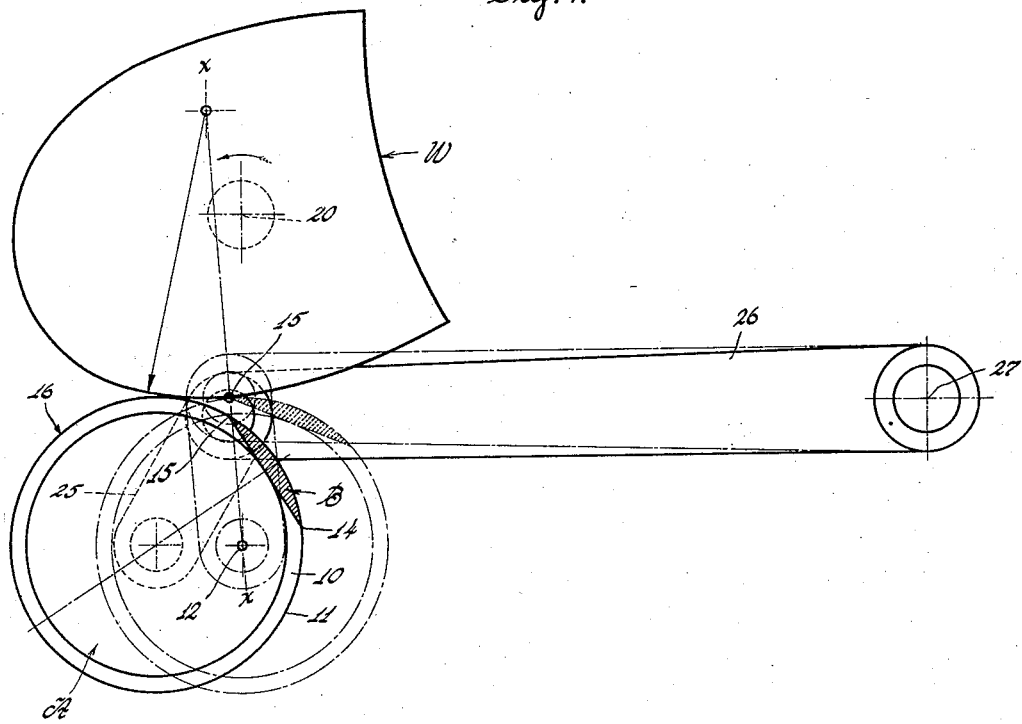

Before referring to the details of the machine, the invention will first be described in connection with the diagrammatic showing of Figs. 1 and 2. It may be here stated that, in the present illustrative disclosure, I have shown the machine as having a cutter of the type disclosed and claimed in the copending application of Penrose R. Hoopes, Serial No. 90,724, filed February 26, 1926 and entitled "Trimming machines". It is to be understood, however, that, while a cutter of that type is peculiarly adapted for use in the combination comprising my invention, my invention is not specifically limited to the precise construction of the cutter shown in said application. The cutter comprises a generally circular cup A, the inside of which is cut away to provide a surface 10 terminating in a cutting edge 11. The cup is mounted for rotation about an axis 12 located at the center of the cup. Cooperating with the cup is a cutter or disk B which is bevelled, as at 13, so as to provide, at its outer periphery, a cutting edge 14. The surfaces 10 and 13 of the cup and disk are formed in such manner that the cutting edge 14 may contact with the edge 11 to form a single point of shear or cut designated by the numeral 15. As explained more fully in detail in said Hoopes application, the surfaces 10 and 13 may be made slightly convex so that the two may contact over a substantial area. The outside of the cup is provided with a circular, in this instance a cylindrical, surface 16 against which the heel may contact during the trimming operation and which serves as a guide as the heel is being turned to expose all sides to trimming action.

Between the cutting edge 11 and the surface 16 there may be a narrow land or flat annular surface which serves to prevent the heel W itself from contacting directly with the shearing point and thus preventing injury to the heel. The resiliency of the rubber is such that a clean cut is obtained, and the flow is removed sufficiently close to the heel that a substantially straight edge results. This land or annular surface is omitted from all of the figures, except Fig. 5, so as to avoid confusion. The overflow on the heel W is omitted in Figs. 1 and 2 for the same reason. The disk B is mounted for rotation on an axis which is at an angle to, and preferably at right angles to, the axis of rotation 12 of the cup A, all as explained more in detail in said Hoopes application.

In accordance with the present invention, there is provided work supporting means which gives to the work a predetermined movement, for example, a rotary movement about a given point in the work. In the present illustrative disclosure, wherein the machine is described in connection with trimming heels, the work support is mounted for rotary movement, the axis thereof being designated in Figs. 1 and 2 by the numeral 20. Also in accordance with the present invention, the cutting instrumentality and the work support are mounted for relative movement one towards the other in order to maintain the edge of the work in engagement with the guiding surface 16 of the cup. In the present illustrative disclosure, the cutting instrumentality is shown, by way of example, as being bodily movable towards and away from the center of rotation of the work, and the axis 20 is fixed, but the arrangement may be reversed.

As hereinafter described more in detail, the cutting instrumentality may be urged against the work by a spring or other desired arrangement.

As previously stated, one of the objects of the present invention is to maintain the cutting point or point of shear 15 automatically in the line of the edge of the work to be trimmed, which is to say, to maintain the cutter and work in such relation that the point of shear coincides with the point of tangency between the cutter and the work. To accomplish this result, the cutting instrumentality is mounted for pivotal or swinging movement about a line which includes the point of shear. In the present illustrative disclosure, the axis of rotation 12 of the cup A is carried by a link or bracket 25 which, in turn, is pivotally carried by a swinging arm 26 fixedly pivoted as at 27, the line of pivot between the bracket 25 and the arm being coincident with the point of shear 15 in all positions of the cutting instrumentality.

Figure 2:
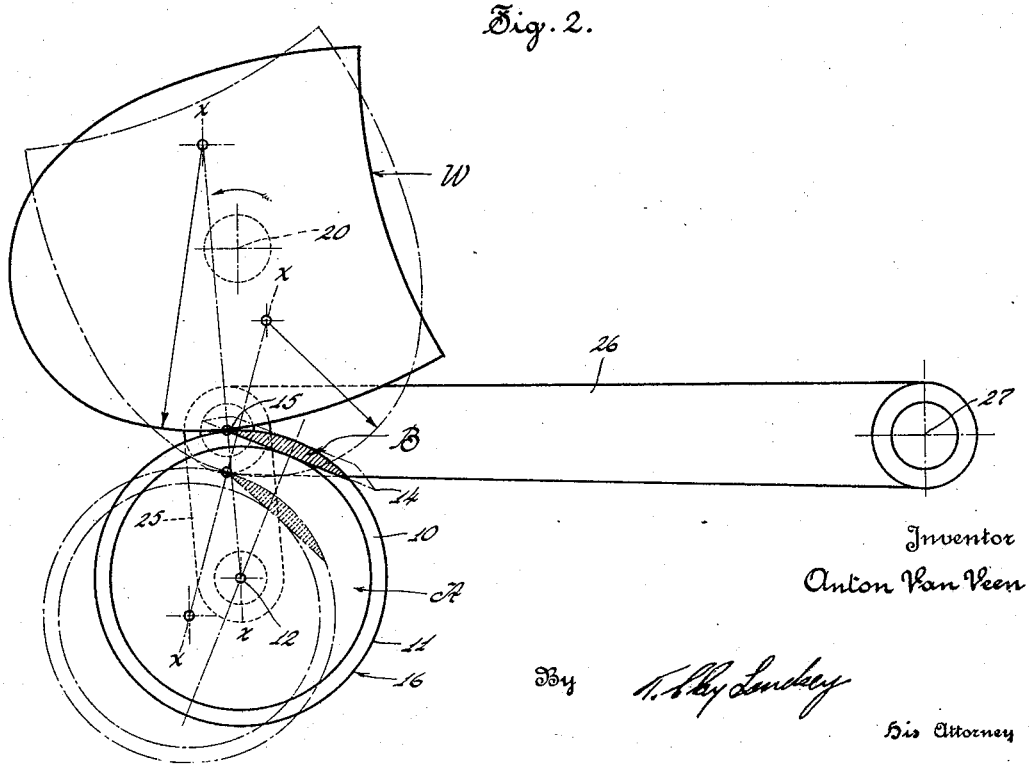
Fig. 2 is also a diagrammatic view showing the heel and cutter by full lines in the cutting relation of Fig. 1 and also showing the heel and cutter in dotted lines after the heel has been turned to bring another portion of its edge into engagement with the cutter.

The construction so far described and its mode of operation will be clearly understood from Figs. 1 and 2. Assuming that the machine has been set up to operate upon a heel, and the cutter, as shown by full lines Fig. 1, is brought into engagement with the heel at a point spaced from the point of shear 15, the cutter, due to its engagement with the heel, will automatically swing about the point of shear 15 and, as the cutter is urged towards the heel, the cutter will roll from the position shown by full lines Fig. 1 to the dotted line position of that figure, thus bringing the point of shear into engagement with the heel at the point of tangency between the cup A and the heel.

As the heel is turned, the cutter will be automatically moved so that the cutter remains in the same constant relation to the heel; that is to say, the point of shear will remain in the edge of the work being trimmed. This will be clearly understood from Fig. 2 wherein is shown, by full lines, the heel in the position of Fig. 1 and the cutter in the cutting position which it has assumed in Fig. 1. The dotted line position of the heel shows the same as having been turned, and the dotted line position of the cutter shows how this cutter has been moved so that it will have the proper cutting relation to the heel in its new position. It will be observed, in each of these figures, that, when the cutter is in proper position with relation to the heel, the axis of rotation of the cup, the point of shear and the center of the arc of that portion of the heel operated upon are all in the same line, this line being designated by the letters x—x.

Figure 3:
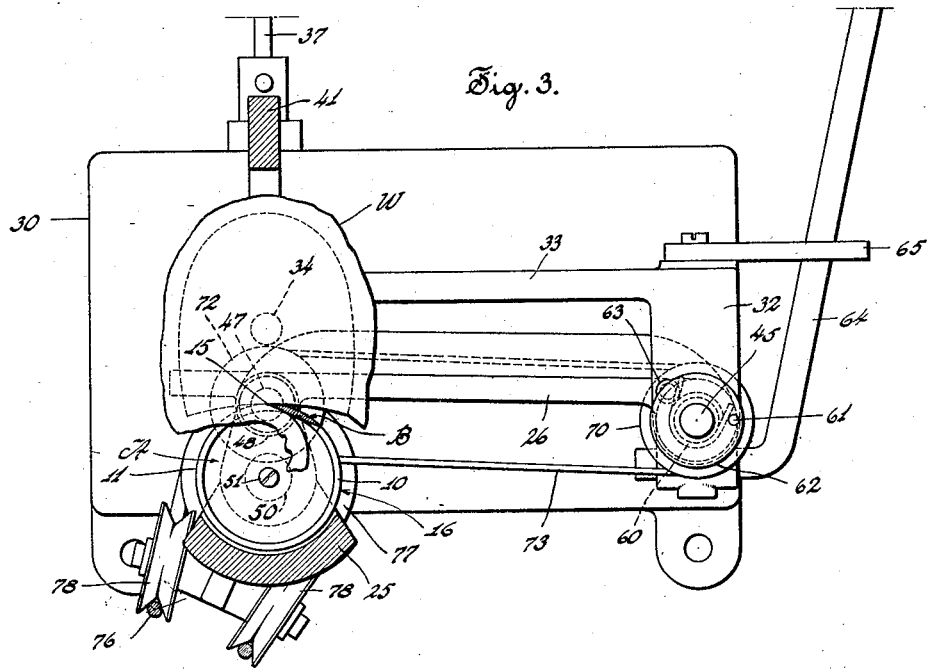
Fig. 3 is a top plan view of a machine in which the improvements of the present invention are incorporated, parts being broken away on line 3—3 of Fig. 5.
Figure 4:
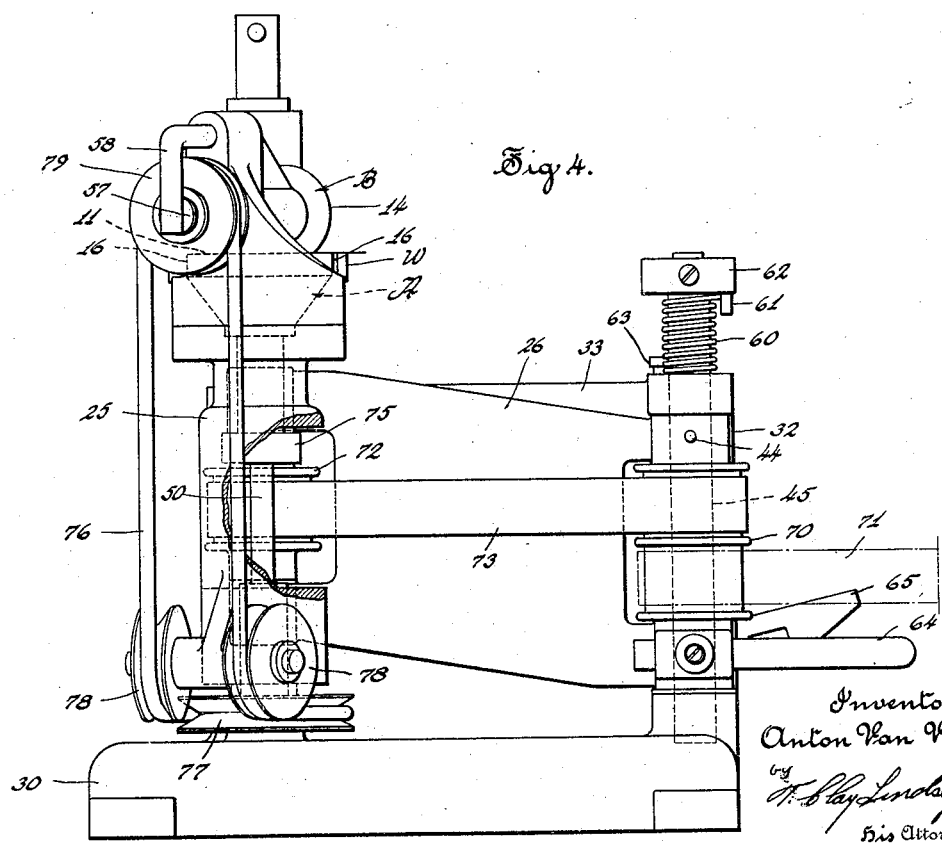
Fig. 4 is a rear elevational view of the machine.

Reference may now be had to the machine shown in Figs. 3 to 5 which, as previously stated, is shown by way of example only so as to indicate one of the many embodiments which the present invention may take. In these figures, the machine is shown as having a frame with a base 30, a pair of spaced standards 31 and 32, and a brace 33 between the upper ends of the standards. Mounted in suitable bearings in the standard 31 is a vertical shaft 34 carrying, on its upper end, a work support or table 35 which, in the present instance, has upstanding pins 36 adapted to engage in suitable nail holes in the heel for properly positioning the latter, and for driving purposes. The shaft 34, together with the work support thereon, may be rotated in any suitable manner. In the present instance, the shaft is shown as being capable of being rotated manually by turning a handle 37 to which is connected a bevel gear 38 meshing with a bevel gear 39 on the lower end of the shaft 34.

If desired, the heel may be held down on the support 35 by a clamp 40 slidably mounted in a bracket arm 41 and urged downwardly by a spring 42.

Mounted in suitable bearings in the standard 32 is a pivot pin 45 to which is fixed, by a pin 44, the arm 26, as shown most clearly in Figs. 3 and 4. Pivotally carried on the free end of this arm 26 is the swinging bracket or link 25 which carries the cutting instrumentality. In the present illustrative disclosure, the bracket 25 carries opposed bearings or centers 46 engaging the opposite ends of a pin or shaft 47 fixed by a pin 43 in the free end of the arm 26. Journalled in the bracket 25 is a shaft 50 which is parallel to the pin 47, the axes of the pin 47 and the shaft 50 being spaced apart the same distance as that between the center of rotation of the cutter cup A and the point of shear 15, i. e. the radius of the cutter cup A. The cutter cup A is secured to the shaft 50 so as to rotate therewith by means of a screw 51 and a driving pin 52. Rotatably mounted on the upper part 25' of the bracket 25 on an axis normal to the axis of the shaft 50 is a shaft 55 which carries the cutter disk B. For the purpose of holding the cutting edge 13 of the disk in contact at all times with the cutting edge 11 of the cup, and thus automatically taking up whatever wear may occur, the shaft 55 has endwise movement, and a spring 56 is provided for normally urging this shaft towards the left, referring to Fig. 5. Behind the spring is a stud 57 which engages against an arm 58 carried by the part 25' of the bracket 25.

For the purpose of normally urging the cutter towards and against the heel, any suitable arrangement may be provided. In the present instance, there is shown, to this end, a spring 60. As will be seen from Figs. 3 and 4, this spring is coiled about the upper end of the pin 45, and one end of the spring engages a projection 61 carried by a collar 62 which is fixed to, so as to rotate with, the pin 45. The other or lower end of the spring engages a projection 63 on the upper end of the bearing in which the pin 45 is journalled. In order to move the cutter away from the work support preliminarily to positioning a heel on the latter and to move the cutter away from the heel after the cutting operation has been completed, a handle 64 may be provided. This handle, as will be seen most clearly from Fig. 4, is fixed to the pivoted end of the swinging arm 26. The cutter may be maintained away from the support by means of a latch 65.

The driving means for the parts of the cutter instrumentality will now be described. Journalled on the pin 45 is a double pulley 70 about which passes a drive belt 71. On the shaft 47, about the axis of which the bracket 25 swings, is a pulley 72 driven from the pulley 70 by a belt 73. Fixed to the pulley 72 is a gear 74 which meshes with a gear 75 fixed to the shaft 50 which carries the cutter cup A. The cutter disk B is driven from the shaft 50 through a belt 76. This belt passes about a pulley 77 on the lower end of the shaft 50; idlers 78 journalled on the bracket 25; and a pulley 79 formed integrally with, or suitably secured to, the shaft 55.

The operation of the machine will be fully understood from the description which has been made with respect to Figs. 1 and 2. It will be understood, of course, that the numerals 12, 20 and 27 of Figs. 1 and 2, respectively, indicate the axes of rotation of the respective shafts or members 50, 34 and 45, of the machine shown in Figs. 3 to 5. Also, the point of shear 15 lies in the axis of the bearings 46.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a trimming machine, a work supporting instrumentality, a cutting instrumentality having a cutting point and arranged to engage and be guided by the edge of the work to be trimmed, means for supporting said cutting instrumentality for bodily movement so that the engagement between the cutting instrumentality and the work maintains the cutting point at the point of tangency therebetween and means for urging the cutting instrumentality towards the work.

2. In a machine for trimming the edges of articles, a cutting instrumentality having a pair of cooperating members with a shearing point therebetween, one of said members having a circular cutting edge, and means for supporting said cutting instrumentality for swinging movement about the shearing point.

3. In a machine for trimming the edges of articles, a cutting instrumentality having a pair of cooperating members with a shearing point therebetween, one of said members having a circular cutting edge, a surface concentric with said edge and against which the work is adapted to engage, and means for supporting said cooperating members for swinging movement in unison about said shearing point.

4. In a trimming machine, a cutting instrumentality including a cup having a circular cutting edge, a disk having a cutting edge cooperating with a cutting edge of said cup and forming therewith a shearing point, said cup and disk being mounted for rotation about axes substantially at right angles to one another, and means for supporting said cutting instrumentality for swinging movement about an axis generally parallel to the axis of rotation of said cup and passing through said shearing point.

5. In a trimming machine, a disk having a circular cutting edge lying in its outermost periphery and mounted for rotation on an axis perpendicular to a plane passing through said cutting edge, a cup having a circular cutting edge lying in its inner periphery and mounted for rotation on an axis perpendicular to a plane through said cutting edge, said cup and disk being so mounted with respect to one another that said planes intersect in a line which forms a chord of both circular cutting edges, and means for supporting said disk and cup for angular movement about an axis extending in the same general direction as the axis of rotation of the cup and passing through the point of shear formed by said cutting edges.

6. In a trimming machine, in combination, a disk having a circular cutting edge lying in its outermost periphery, said disk being mounted for rotation on an axis perpendicular to a plane through said cutting edge, a cup having a circular cutting edge lying in its inner periphery, said cup being mounted for rotation on an axis perpendicular to a plane through said cutting edge, said cup and disk being so mounted with respect to each other that said planes intersect in a line which forms a chord of both circular cutting edges, said cup being provided with a cylindrical surface around its outer periphery against which the work to be trimmed may bear, and means for supporting said disk and cup for swinging movement about an axis generally parallel to said cylindrical surface and passing through the point of shear formed by said cutting edges.

7. In a trimming machine, a swinging bracket, a cup-shaped cutting member rotatably mounted therein, a disk-shaped cutting member cooperating with said first cutting member to form a single point of shear and rotatably mounted in said bracket on an axis passing through the point of shear.

8. In a trimming machine, a swinging arm, a bracket pivoted thereto for swinging movement, a cutting instrumentality including a cup having a circular cutting edge and mounted for rotation in said bracket, said cutting instrumentality also including a disk-shaped member having a circular cutting edge cooperating with said first cutting edge to form a point of shear, said disk-shaped member being rotatably mounted in said bracket on an axis substantially perpendicular to the axis of rotation of said cup, the pivotal connection between said bracket and arm being in alignment with said point of shear.

9. In a trimming machine, a work supporting instrumentality, a cutting instrumentality having a cutting point and arranged to engage and be guided by the edge of the work to be trimmed, said instrumentalities being mounted for relative movement one towards the other, means normally urging said instrumentalities towards one another, and means for supporting said cutting instrumentality so that the engagement between the cutting instrumentality and the work maintains the cutting point at the point of tangency therebetween.

10. In a trimming machine, a rotatable work supporting instrumentality, a cutting instrumentality having an active cutting point, means for supporting one of said instrumentalities for movement towards the other one, means for urging the movable instrumentality towards the other one, and means for supporting said cutting instrumentality for swinging movement about an axis substantially including said cutting point.

11. In a trimming machine, a work support, a cutting instrumentality having a single shearing point and including a member having a circular surface against which the work to be trimmed may bear, said shearing point lying substantially in said surface, and means for supporting said cutting instrumentality for movement towards said support and for swinging movement about an axis including said shearing point.

12. In a trimming machine, a rotatable work supporting instrumentality, a cutting instrumentality including a disk having a circular cutting edge lying in its outermost periphery and mounted for rotation on an axis perpendicular to a plane passing through said cutting edge, said cutting instrumentality also including a cup having a circular cutting edge lying in its inner periphery and mounted for rotation on an axis perpendicular to a plane through said cutting edge, said cup and disk being so mounted with respect to one another that said planes intersect in a line which forms a chord of both circular cutting edges, means for supporting said disk and cup about an axis extending in the same general direction as the axis of rotation of the cup and passing through the point of shear formed by said cutting edges, and means for yieldingly urging one of said instrumentalities towards the other one.

13. In a trimming machine, a work support mounted for rotation about an axis substantially perpendicular to the plane of said support, pins on said support to engage the work to locate it in fixed relation to said axis, a cutting instrumentality, means for positioning said cutting instrumentality in operative engagement with the work, and means whereby said cutting instrumentality is caused to adjust its position relative to the work as the work is rotated.

ANTON VAN VEEN.